C. F. MILLICAN & J. H. WIEST.
INTERCONVERTIBLE HARVESTER, MOWER, OR TRACTOR.
APPLICATION FILED JULY 3, 1914.

1,251,265.

Patented Dec. 25, 1917.
8 SHEETS—SHEET 4.

WITNESSES:
J. H. Gardner
M. E. Sparrow

INVENTORS:
Carl F. Millican,
Jonas H. Wiest,
By E. F. Silvius,
ATTORNEY.

C. F. MILLICAN & J. H. WIEST.
INTERCONVERTIBLE HARVESTER, MOWER, OR TRACTOR.
APPLICATION FILED JULY 3, 1914.

1,251,265.

Patented Dec. 25, 1917.
8 SHEETS—SHEET 5.

WITNESSES:
J. H. Gardner.
M. E. Sparrow

INVENTORS:
Carl F. Millican,
Jonas H. Wiest,
By E. T. Silvius,
ATTORNEY.

C. F. MILLICAN & J. H. WIEST.
INTERCONVERTIBLE HARVESTER, MOWER, OR TRACTOR.
APPLICATION FILED JULY 3, 1914.

1,251,265.

Patented Dec. 25, 1917.

WITNESSES:
J. H. Gardner.
M. E. Sparrow.

INVENTORS:
Carl F. Millican,
Jonas H. Wiest,
By E. T. Silvius,
ATTORNEY.

UNITED STATES PATENT OFFICE.

CARL F. MILLICAN AND JONAS H. WIEST, OF INDIANAPOLIS, INDIANA.

INTERCONVERTIBLE HARVESTER, MOWER, OR TRACTOR.

1,251,265.   Specification of Letters Patent.   Patented Dec. 25, 1917.

Application filed July 3, 1914. Serial No. 848,992.

*To all whom it may concern:*

Be it known that we, CARL F. MILLICAN and JONAS H. WIEST, citizens of the United States, residing at Indianapolis, in the county of Marion and State of Indiana, have invented a new and useful Interconvertible Harvester, Mower, or Tractor, of which the following is a specification, reference being had to the accompanying drawings, and to the letters and figures of reference marked thereon.

This invention relates to a machine that is adaptable for various uses, and especially in agricultural districts, the invention having reference generally to a combined tractor and harvester, and more particularly to a tractor that is especially adapted to operate various agricultural or other implements.

The primary object of the invention is to provide an improved tractor that shall be so constructed as to be adapted to operate not only on roads but in fields and to be readily controlled and be very powerful in operation, which tractor shall be strongly built and yet not be unwieldy.

Another object is to provide a combined tractor and harvester that shall be so constructed that the harvesting apparatus may readily be disconnected from the tractor machine in order that the latter may be utilized for various purposes other than harvesting crops; an object being to provide improved harvesting machinery of such construction as to be adapted to be detachably connected to a tractor machine and therefore be relatively inexpensive as a harvesting machine.

Another object is to provide a tractor that shall be so constructed as to be capable of operating either a mowing appliance, plowing or cultivating implements, or to carry a suitable wagon bed or carrying frame for hauling purposes, or which may be utilized without a wagon bed for hauling logs or other articles, or for dragging various implements or articles or for pulling vehicles.

A still further object is to provide an interconvertible power machine of such construction as to be adapted as a general utility machine on the farm, either as an automobile or as a stationary power machine in order to obviate the necessity of incurring the cost of separate complete machines for each purpose required, which machine shall be reliable, durable and economical in use.

With the above-mentioned and other objects in view the invention consists in a tractor of novel construction having an arched frame of such construction as to provide a transverse opening adapted to receive portions of different types of machines, and whereby the machines shall be partially supported and also fully controlled in operation, the arched frame being adapted also to carry a wagon bed or similar conveyance for hauling purposes. The tractor frame is adapted also to have plows or other implements connected thereto. The invention consists further in harvesting machinery of novel construction provided only partially with carrying means and also adapted to be connected to and partially carried by the arched tractor frame. The invention consists also further in the novel parts, and in the combinations and arrangements of parts, as hereinafter particularly described and further defined in the appended claims.

Referring to the drawings forming parts of this specification and on which similar reference characters on the different figures thereof indicate corresponding elements or features of construction—

Fig. 12 is a side elevation of the improved harvesting machinery detached from the tractor. Fig. 13 is a fragmentary section approximately on the line C C on Fig. 12. Fig. 14 is a fragmentary section on an enlarged scale also on the line C C. Fig.

15 is a fragmentary section on the plane of the line D D on Fig. 13. Fig. 25 is a fragmentary side elevation of the tractor on which a wagon bed shown in broken lines is carried in the arched frame; and, Fig. 26 is a top plan of the tractor with which the position of a mower shown in broken lines is illustrated as being connected with the arched frame, a gang of plows shown in broken lines being illustrated as being connected to the rear end of the tractor frame.

In practically carrying out the objects of the invention an arched main frame or tractor frame of novel construction is provided and preferably is composed of two channel bars suitably bent so as to form two horizontal rear portions 1 and 2 from which upright portions 3 and 4 extend respectively, horizontal arch or crown portions 5 and 6 extending forward from the upright portions, the forward portions of the bars being bent to form downwardly extending curved portions 7 and 8 extending from the horizontal crown portions 5 and 6 respectively. The curved portions 7 and 8 preferably are curved so as to extend each toward the other, upright portions 9 and 10 extending from the curved portions 7 and 8 respectively, and they are connected to a bolster 11 whereby the forward ends of the frame bars are supported. The horizontal rear portions of the bars are carried by two driving wheels 12 and 13 rotatably mounted on stub axles 14 and 15 respectively, the inner ends of the axles being provided with hangers 16 and 17 respectively which support a main axle bar 18. Two springs 19 and 19' are suitably supported by the axle bar 18 and are connected with and support the horizontal portions 1 and 2 of the frame. The arrangement is such that the stub axles may be slightly moved forward or rearward relatively to the main frame. The upper portions of the hangers or the stub axles are provided with ears 20 and 21 respectively to which adjusting bars or rods 22 and 23 are respectively connected and may be variously connected with the main frame for adjustably holding the stub axles relatively to the main frame. The inner sides of the driving wheels are provided with sprocket wheels 24 and 25 respectively whereby to apply power for rotating the driving wheels. A suitable open frame 26 which preferably is cast as a single piece is fixedly secured to the frame portions 1 and 2.

For carrying the front end of the tractor frame two guiding wheels 27 and 28 are employed and rotatably mounted on stub axles 29 and 30, respectively, which are connected by means of vertical pivot pins 31 and 32 respectively to an axle bar 33 having a central horizontal pivot 34 whereby a spring-saddle 35 is connected to the axle bar so that the ends of the latter may rise or fall when passing over uneven ground, a spring 36 being mounted upon the spring saddle and connected to and supporting the bolster 11. A guide bar 37 is secured to the spring-saddle and extends upward behind the spring through a boss 38 formed on the bolster to prevent the axle bar from turning over, the bolster being permitted to move up or down on the spring relatively to the guide bar. The axle bar is provided also with a brace which comprises a coupler head 39 having two arms 40 and 41 fixedly connected thereto, the arms being connected to pivots 42 and 42' with which the rear portion of the axle bar 33 is provided. A jaw bolt 43 is rotatably fitted into the coupler head 39 and provided with a horizontal wrist pin 44 to which a lug 45 is connected, the latter being supported as will be hereinafter explained. The stub axle 29 is provided suitably with a steering arm 46 to which a coupling rod 47 is connected, the latter being connected to a steering arm 48 with which the stub axle 30 is provided whereby the two guiding wheels are coupled so as to turn in unison. The stub axle 30 is provided with a main steering arm 49 to which a link 50 is connected for controlling both of the guiding wheels, the link 50 being operated and controlled by means which will be further explained.

The arched main frame is provided with two channeled vertical guide bars 51 and 52 which are spaced apart and secured to the frame portion 5 so as to extend downward therefrom, and two similar but reversely arranged guide bars 53 and 54 secured to the horizontal portion 6 of the frame. Preferably a tie bar 55 is secured to the lower portions of the guide bars 51 and 53, and preferably an angle brace 56 is secured to the upright portion 3 of the frame arch and also to the guide bar 51, a similar angle brace 56' being secured to the vertical portion 4 and also to the guide bar 53, so that the guide bars shall be firmly secured to the frame arch. A cross-bar 57 is secured to the portions 5 and 6 of the frame arch adjacent to the guide bars 51 and 53, a similar cross-bar 58 being secured also to the portions 5 and 6 adjacent to the guide bars 52 and 54. A tie-bar 59 is secured to the lower forward portions of the guide bars 52 and 54 and the lug 45 is fixedly secured thereto. A journal box 60 is secured to the frame portion 6, a journal box 61 being secured to the tie bar 59, and a shaft 62 is vertically arranged and rotatably mounted in the two journal boxes and provided on its lower portion with an arm 63 to which the link 50 is connected for controlling the guiding wheels. The upper portion of the shaft 62 is provided with a gear segment 64. Journal boxes 65, 66 and 67 are secured to the frame portion 6 and rotatably support a steering shaft 68 in inclined position, the shaft having a beveled gear wheel 69 secured thereto that meshes with the segment 64 whereby to turn the shaft 62. The shaft 68 extends rearwardly and upwardly to a point nearly above the cross-bar 57 and is provided with a hand steering wheel 70 for turning the shaft, a seat 71 being mounted on the upper portion of the upright frame portion 4 so as to be in proximity to the hand steering wheel 70 and enable the operator to conveniently control all the controllable elements of the machine.

The seat 71 is in proximity to the forward end of the frame 26 on which a suitable motor 72 is mounted, the motor preferably being of the explosion engine type and requiring no description in detail. A suitable housing 73 is mounted on the tractor frame and rotatably supports a suitable jack-shaft 74 provided with sprocket wheels 75 and 76, the housing, as will be understood, being adapted to contain the usually desired differential and speed changing gearing. A sprocket chain 77 connects the sprocket wheels 24 and 75 and a similar chain 77' connects the wheels 25 and 76. Suitable pivot heads 78 and 79 are connected with the jack-shaft or its housing and are provided respectively with adjusting screws 80 and 81 which are connected with the adjusting bars 22 and 23 respectively, so that the adjusting bars are practically connected with the main frame, and the adjusting screws of the bars permit the bars to be lengthened so as to take up slack resulting from wear of the sprocket chains 77 and 77'. The crank shaft of the engine obviously is connected with the jack-shaft and provided with a clutch device 82 provided with a controlling lever 83 that is in proximity to the operator's seat 71, another lever 84 being mounted on the housing 73 for controlling the speed changing gearing as will be understood, the latter lever being also in proximity to the seat.

For adjustably supporting the main portion of the harvesting machinery or such apparatus or carrying frame as it may be desired to carry under the arch of the main frame, two hanger frames are provided which, as will further appear, are coupled together so as to operate as one, but are spaced apart to provide a clear opening to receive the carrying frame, one frame comprising a spider or main member 85 uprightly arranged and having slides 86 and 87 thereon movably guided by the guide bars 51 and 53 respectively, the lower end of the frame having a forward extending ledge 88 thereon preferably provided with upwardly extending projections or dowels 89 and 89' between which the ledge is provided with a boss 90 having a socket 91 therein. A rack bar 92 is secured to the spider or main member 85 and extends upward adjacent to the cross-bar 57. The companion hanger frame comprises a similar spider or main member 85' having slides 86' and 87' thereon that are guided by the guide bars 52 and 54, the lower portion of the frame having a rearward extending ledge 88' thereon provided with projections 89'' and 89''' and also a boss 90' having a socket 91' therein. A rack bar 93 is secured to the spider 85' and extends upward adjacent to the cross-bar 58. The rack bars are provided respectively with gear teeth 94 and 94'. An adjusting and supporting shaft 95 is rotatably mounted on the cross-bars 57 and 58 and has a gear wheel 96 loosely mounted thereon in engagement with the rack bar 92 and also a gear wheel 97 in engagement with the rack bar 93, the shaft being provided with a controlling wheel 98 whereby the shaft may be rotated by hand. The cross-bars 57 and 58 are provided with guide rollers 99 and 99' against which the rack bars 92 and 93 are guided and held in mesh with their controlling gear wheels. A ratchet wheel 100 is secured to the shaft 95 and normally engaged by a dog 101 that is mounted on the cross-bar 57 for preventing the rack bars from being accidentally lowered. A winding drum or spool 102 is secured to the shaft 95 which may be used for winding up a chain or cable whereby to raise the cutter bar of a mower when connected to the tractor frame, the frame portion 6 having a guide sheave 103 thereon adapted to guide the chain or cable. In order to permit the shaft 95 to rotate without changing the adjustment of the hanger frame, the gear wheels 96 and 97, as above stated are loose on the shaft, and in order to enable the shaft to adjust the hanger frame the gear wheels are provided with clutch members 104 and 104' respectively, suitable clutch members 105 and 105' being adapted to be secured to the shaft in clutching engagement with the members of the gear wheels.

The harvesting machinery is provided with its own carrying frame so that all may be handled independently of the tractor, the frame comprising a head bar 106 provided with dowels 107 and 107' adapted to be inserted in the sockets 91 and 91' respectively, the bar being secured to and supporting one end portion of two main bars or sills 108 and 109 which preferably are connected together also by means of a crossbar 110, an end bar 111 being connected to the opposite end of the bars 108 and 109, the latter preferably being approximately Z-shaped in cross-section. An end frame of suitable construction is mounted on the end bar 111 and the adjacent ends of the main bars or sills and preferably comprises posts 112 and 113 which support a beam 114 and also a horizontal bar 115 below the beam. A casting 116 constituting a housing is secured to the beam 114 and has guides 117 thereon, suitable guides 118 being secured to the bar 115 below the guides 117. An axle bar 119 is vertically arranged and movable in the guides and is provided on one side with gear teeth 120, the lower end of the bar being provided with an axle 121 on which a carrying wheel 122 is mounted, a brace bar 123 preferably being connected to the axle and also to the bar 119. A short shaft 124 is rotatably mounted in the housing 116 and provided on its outer end with a gear wheel 125 that meshes with the gear teeth 120, a sprocket wheel 126 being secured to the opposite end portion of the shaft whereby to adjust the carrying frame relatively to the carrying wheel. At a suitable distance from the end frame so as to be in proximity to the tractor frame arch, an arch is mounted on the main bars or sills 108 and 109 and comprises an upright member 127 supporting one end of a crown bar 128, the opposite end of which is supported by an upright member 129. A stand 130 is secured upon the crown bar 128 and is provided with a journal box 131 and also a quadrant 132 which is notched on its upper and lower sides so as to be engaged by the latches of two levers. A journal box 133 is mounted upon the beam 114 of the end frame so as to be in alinement with the journal box 131, and a shaft 134 is rotatably mounted in the two journal boxes and provided with an upward extending arm 135 adjacent to the journal box 133, the opposite end of the shaft being provided with an upward extending operating lever 136 adapted to be latched to the quadrant 132, another lever 137 being pivotally supported on the shaft and adapted to be latched also to the quadrant 132. A hollow shaft 138 is rotatably supported on the shaft 134 and extends from the journal box 133 approximately to the lever 137. A sprocket wheel 139 is secured to the hollow shaft adjacent to the journal box 133 and is connected by means of a sprocket chain 140 with the sprocket wheel 126 whereby to operate the shaft 124 and control the bar 119. The hollow shaft 138 is provided with suitable means for its operation and control, a hand wheel 141 preferably being employed and secured to the shaft so as to be in proximity to the operator's seat 71, the shaft having a ratchet wheel 142 fixed thereon adjacent to the hand wheel 141, the ratchet wheel being normally engaged by a pawl 143 mounted on an arm 144 which is secured to the member 127. The shafts 134 and 138 preferably are steadied by means of supports 145 and 145' which are mounted upon the rail or sill 108 and in which the shaft 138 is rotatably supported.

Cutting apparatus may suitably comprise fingers or dividers 146 and a knife bar 147 slidingly mounted on the rail or sill 109 and provided with knives 148, a pitman 149 being connected to the knife bar and also to a crank shaft 150 having a sprocket wheel 151 secured thereto, the crank shaft being rotatably supported jointly by the bar 109 and a bracket 152 secured to the bar.

A suitable elevating conveyer is provided and is built upon the rails or sills 108 and 109 of the carrying frame so as to normally be under the arched portion of the tractor frame. The elevating conveyer may suitably comprise a lower frame 153 and an upper frame 154 connected at its lower end to the rails 108 and 109 adjacent to the upright members 127 and 129 and extending upward toward the portion 5 of the arched frame, the upper end being supported by means of posts 155 and 156 secured upon the bars 108 and 109 adjacent to the cross-bar 110, the upper frame 154 having a roof 157 thereon. An inclined guide floor 158 is suitably supported above the lower frame 153 for guiding the grain stalks upward from a horizontal platform floor 159 which is secured to the rails 108 and 109 from which the grain stalks fall after having been cut. Preferably a stop board 160 is supported upon the frame bar 108. Preferably the elevating conveyer has side boards 161 and 162 connected to the frames 153 and 154. A suitably inclined binder frame 163 is connected with the upper end of the elevating conveyer, as is customary.

For the purpose of driving the cutting apparatus and the binding apparatus, a shaft 164 is rotatably mounted upon the upper frame 154 of the elevating conveyer and is provided on its rearward end with a suitable coupling member 165. For the purpose of driving the shaft 164 a short shaft 166 is rotatably mounted in a bracket 167 which is secured to the hanger frame member 85, the shaft 166 being in alinement with the shaft 164 and provided with a coupling member 168 with which the coupling member 165 is normally connected. In order to drive the shaft 166 a countershaft 169 is rotatably mounted on the horizontal portion of the tractor frame in proximity to the bar portion 2 and has a suitable flexible connection with the shaft 166, as by means of an intermediate shaft 170 which is connected by means of a universal coupling 171 with the shaft 169 and a similar coupling 172 with the shaft 166. A sprocket wheel 173 is mounted to rotate on the shaft 169 and has a clutch member 174 adapted to be engaged by a clutch member 175 splined on the shaft and controlled by means of a fork 176 carried by a controlling lever 177 mounted on the bar portion 2 of the frame. A sprocket chain 178 is connected with the sprocket wheel 173 and also with a sprocket wheel 179 secured to a shaft 180 which may be an extension of the crank shaft of the engine or may be a countershaft driven by the crank shaft, as may be desired. Preferably a pulley 181 is secured to the shaft 169 whereby to drive a belt when the tractor is required to be used as a stationary engine.

Figure 1:
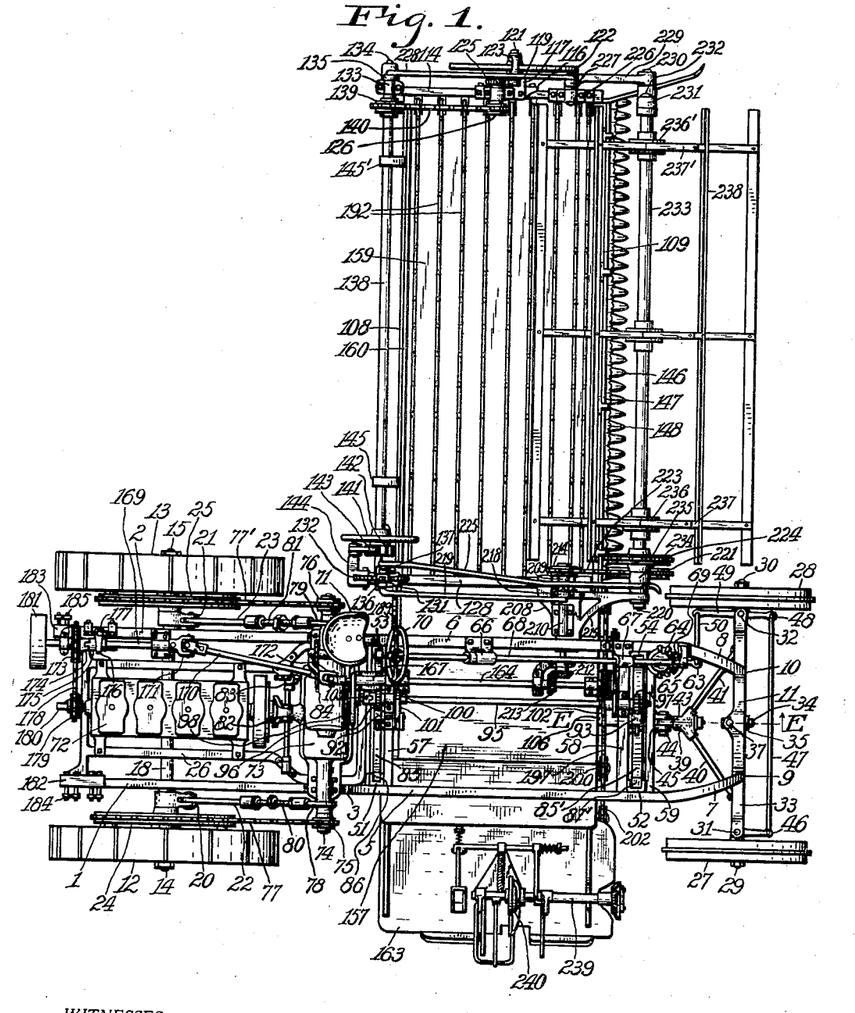
Figure 1 is a top plan of a combination tractor and harvester or reaper constructed substantially in accordance with the invention.
Figure 2:
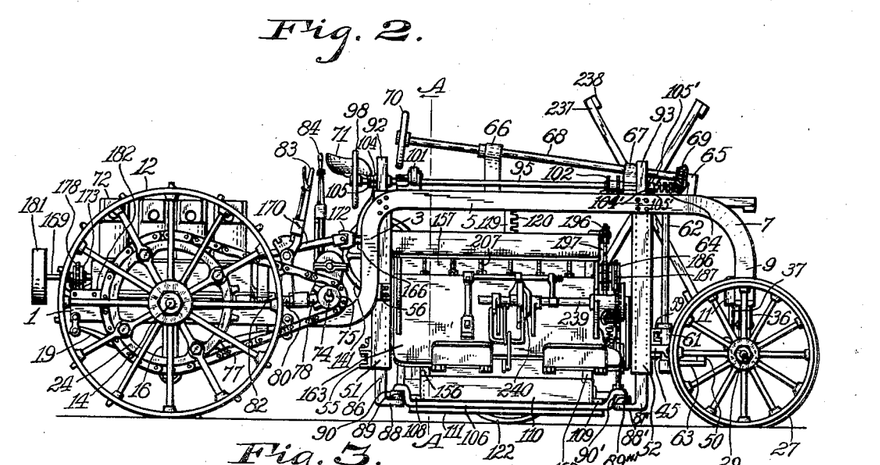
Fig. 2 is a side elevation of the novel machine.
Figure 3:
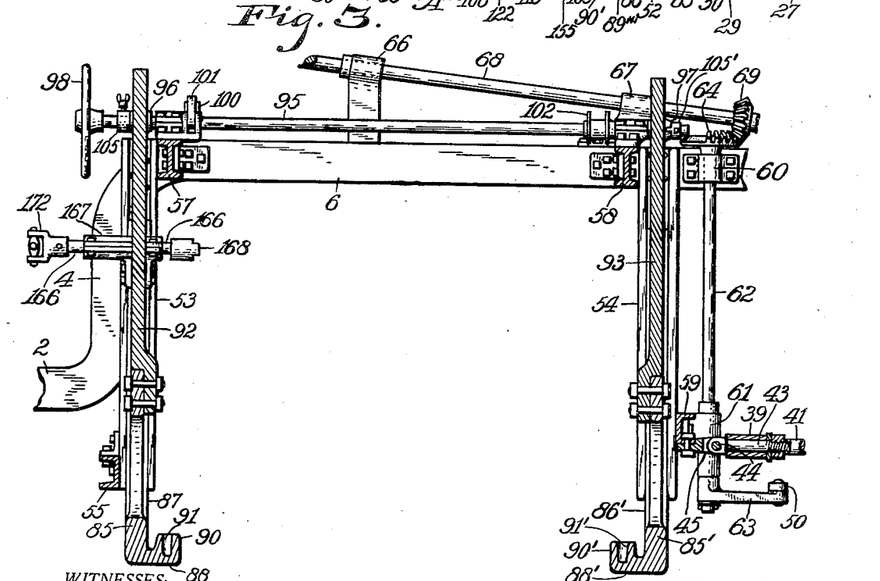
Fig. 3 is a fragmentary longitudinal central section showing apparatus whereby the arched frame adjustably supports various machines or implements or the main portion thereof.
Figures 4, 5:
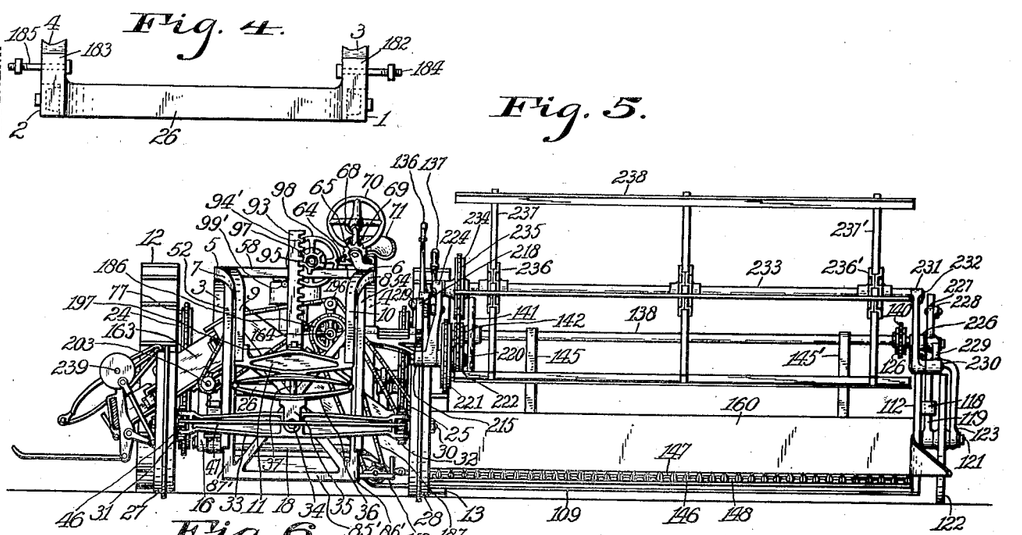
Fig. 4 is a fragmentary rear elevation of the tractor frame.
Fig. 5 is a front elevation of the complete combination machine.
Figure 6:
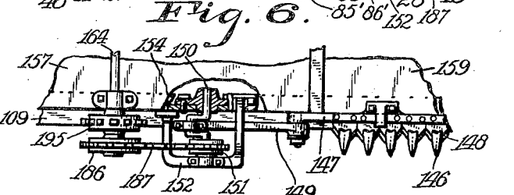
Fig. 6 is a fragmentary top plan partially broken away showing portions of the machine, particularly the cutting apparatus and its operating connections.
Figure 7:
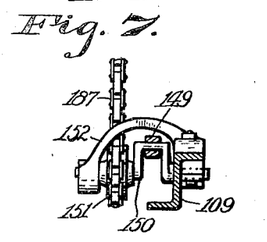
Fig. 7 is a fragmentary longitudinal section of the harvester frame and devices for operating the necessary cutting mechanism.
Figure 8:
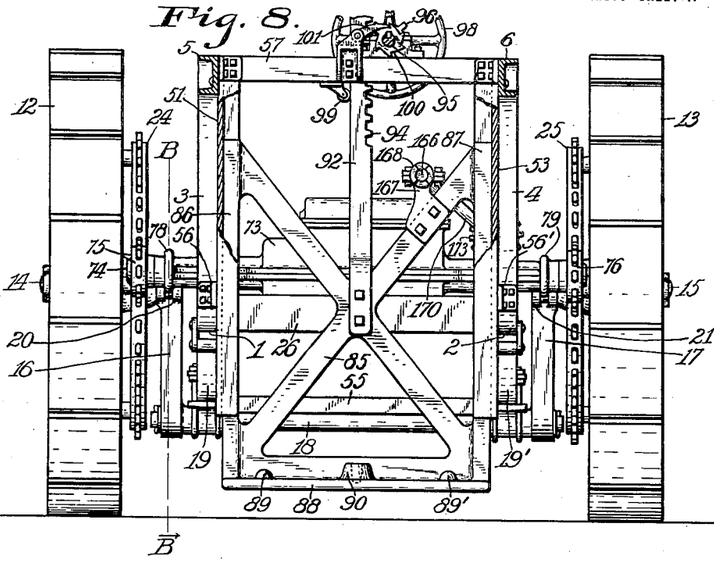
Fig. 8 is a fragmentary section approximately on the line A A on Fig. 2.
Figures 9, 10, 11:
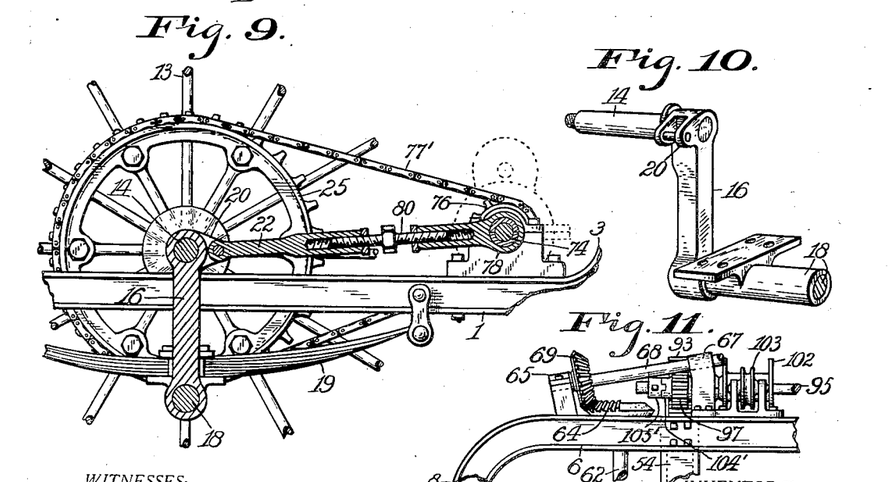
Fig. 9 is a fragmentary section on the line B B on Fig. 8.
Fig. 10 is a fragmentary perspective view of one of the pair of main stub axles.
Fig. 11 is a fragmentary elevation of the tractor frame and gearing thereon.
Figures 12, 13, 14, 15:
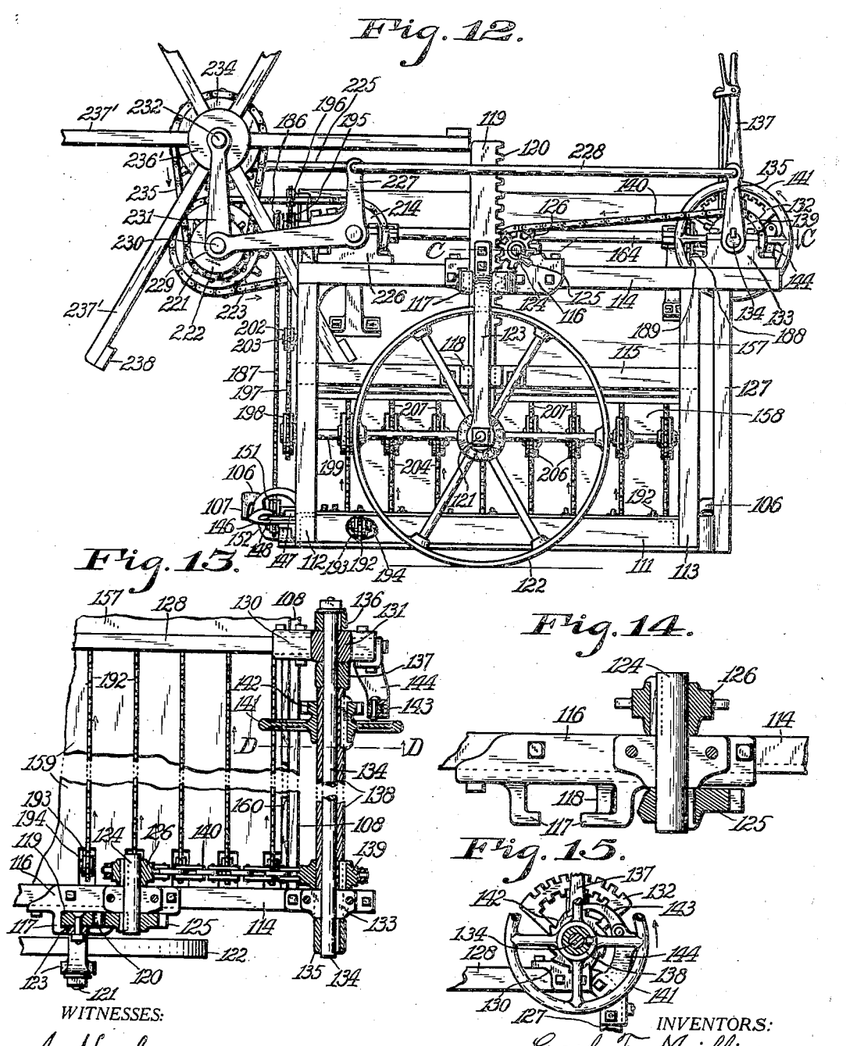
Figure 16:
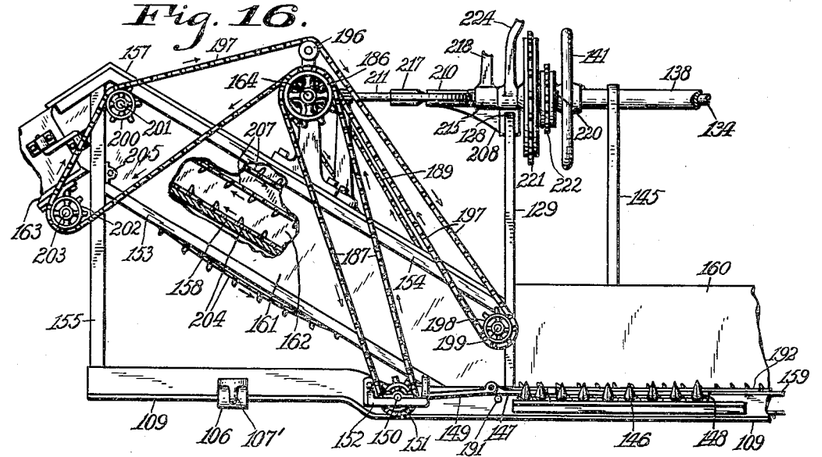
Fig. 16 is a fragmentary front elevation of the harvesting machinery detached from the tractor.
Figure 17:
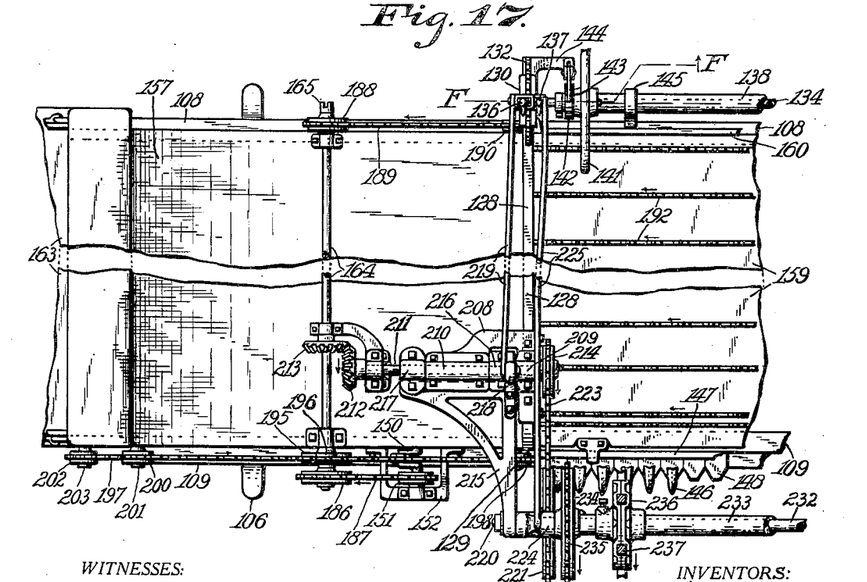
Fig. 17 is a fragmentary top plan of the harvesting machinery detached from the tractor.
Figures 18, 19, 20, 21, 22, 23, 24:
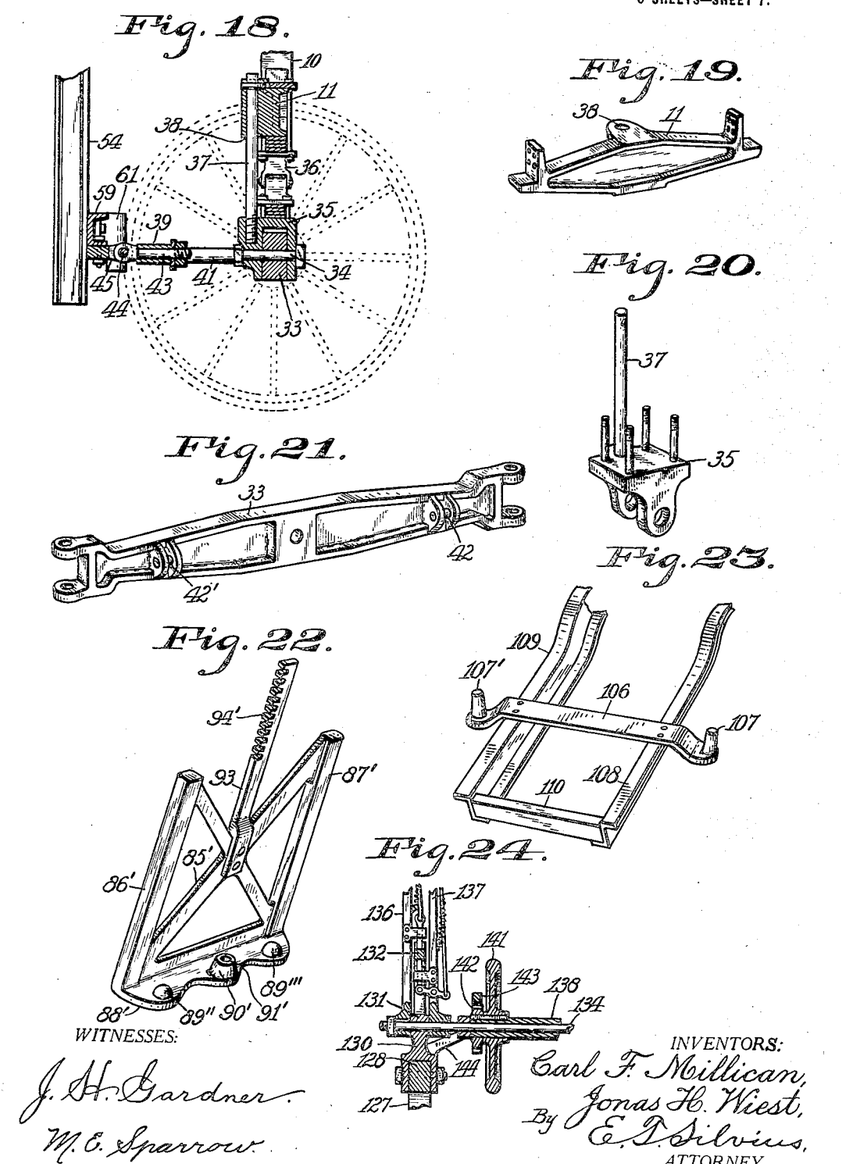
Fig. 18 is a fragmentary vertical section approximately on the line E E on Fig. 1.
Fig. 19 is a perspective view of the front bolster of the tractor.
Fig. 20 is a perspective view of a part of the front tractor axle.
Fig. 21 is a perspective view of the front main axle bar.
Fig. 22 is a perspective view of one of the parts of the arched tractor frame.
Fig. 23 is a fragmentary perspective view of the main frame of the harvesting machinery inverted.
Fig. 24 is a fragmentary section approximately on the line F F on Fig. 17.
Figures 25, 26:
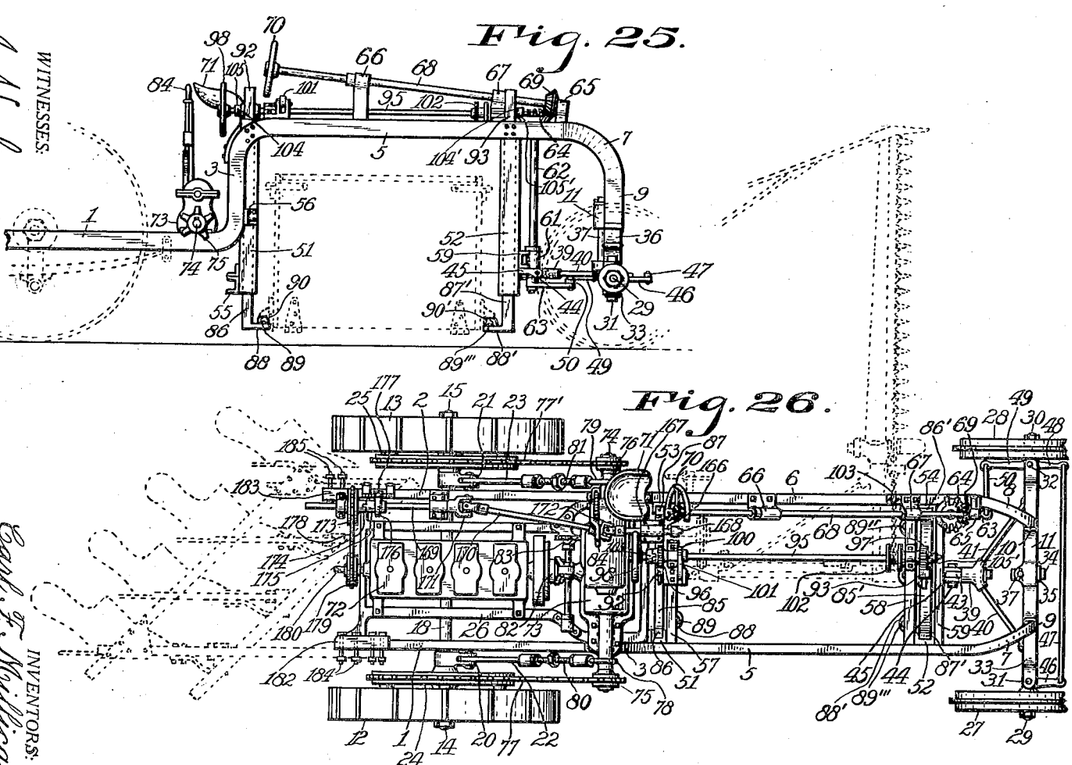

For the purpose of enabling the tractor to be used for draft purposes the rear portion of the frame 26 is provided with upward extensions 182 and 183 provided with securing bolts 184 and 185 adjacent to the rear ends of the bar portions 1 and 2, respectively, whereby various apparatuses or devices may be connected to the tractor frame, as for instance a gang of plows as indicated by broken lines in Fig. 26.

The shaft 164 constitutes the main driving shaft of the harvesting machinery and various gearing may be connected therewith, a sprocket wheel 186 preferably being secured to the shaft and connected by means of a sprocket chain 187 with the sprocket wheel 151 for driving the cutting apparatus, another sprocket wheel 188 being secured to the shaft in proximity to the coupling member 165 and connected by means of a sprocket chain 189 with a sprocket wheel 190 secured to a shaft 191 rotatably mounted in the lower portion of the frame of the elevating conveyer, the shaft 191, as will be understood, being provided with suitable means for driving feed-chains 192 that are guided upon the platform floor 159 and are guided also by guide wheels 193 mounted on a shaft 194 which is rotatably supported at the inner side of the end bar or rail 111. A sprocket wheel 195 is secured to the shaft 164 adjacent to the sprocket wheel 186 and a guide roll 196 is suitably supported above the sprocket wheel 195. A sprocket chain 197 extends over the sprocket wheel 195 and over the roll 196 and also about a sprocket wheel 198 which is secured to a shaft 199 that is rotatably mounted in the lower portion of the elevating conveyer frame above the shaft 191, the sprocket chain extending over a sprocket wheel 200 secured to a shaft 201 rotatably mounted in the upper portion of the elevating conveyer frame, said sprocket chain extending also about a sprocket wheel 202 secured to a shaft 203 that is mounted under the binder frame 163 for driving the binding apparatus. Suitable conveyer chains 204 are arranged to be guided on the floor 158 and driven by suitable means on the shaft 191, the shaft 205 being suitably designed to assist in guiding the chains whereby to convey the grain stalks upon the floor 158 to the binding apparatus. The shaft 199 is provided with sprocket wheels 206 around which extend feed-chains 207 that extend about and are suitably guided by means of the shaft 201 so as to travel above and in the same direction as the chains 204, for assisting in elevating the grain stalks to the frame of the binding apparatus.

A novel reel-operating gearing is provided and preferably comprises a bracket 208 which is secured to the arched crown bar 128 and provided with journal boxes 209 and 210 in which a shaft 211 is rotatably mounted, the shaft having a beveled gear wheel 212 secured thereto that is in mesh with a beveled gear wheel 213 which is secured to the shaft 164, the gear wheel 212 being on one end of the shaft 211, and a sprocket wheel 214 being secured to the opposite end of the shaft. An arm 215 is swingingly connected by means of journal boxes 216 and 217 with the shaft 211 which serves as a pivot for the arm, the arm 215 having a controlling arm 218 thereon that extends upward so that the arms 215 and 218 constitute a bell crank which is controlled by a rod 219 connected to the arm 218 and also to the lever 136. The arm 215 is provided with a stub shaft 220 on which two sprocket wheels 221 and 222 connected together are mounted, the sprocket wheel 221 being connected by means of a sprocket chain 223 with the sprocket wheel 214. An arm 224 is pivotally supported on the shaft 220 and extends upward, a rod 225 being connected to the arm and also to the lever 137 for controlling the arm. A journal box 226 is mounted on the beam 114 of the end frame and pivotally supports a bell crank having an upward extending arm 227 to which is connected a rod 228 that is connected to the arm 135 for controlling the bell crank, the pivotal axis of which corresponds to the axis of the shaft 211, said bell crank having a forward extending arm 229 having a pivot 230 corresponding to the axis of the shaft 220. An arm 231 is supported on the pivot 230 and extends upward. A reel is rotatably supported by the arms 224 and 231 preferably by means of an axle rod 232 connected to the upper ends of the arms and a hollow shaft 233 on the rod provided with a sprocket wheel 234 connected by means of a chain belt 235 with the wheel 222, the shaft having a suitable number of hubs 236 and 236' thereon from which arms 237 and 237' extend radially, the ends of the arms being provided as usual with bars 238.

Various types of binding apparatus may be employed as may be preferred and supported by the binder frame 163 onto which the cut grain is delivered, a well known type of binder being illustrated in position. The binder includes a driving shaft 239 mounted on the binder frame for operating the various parts of the appliance which includes a knotter 240 and various other devices as will be understood.

It is to be understood that the details of the various frame structures and machinery may be varied and mechanical expedients be employed in the construction of the invention, and that the means for adjusting a carrying frame or the harvester frame and gearing may be variously modified, all within the scope of the appended claims.

In practical use the combined tractor and harvester is propelled by its motor and is guided by means of the steering wheel 70. The operator may promptly adjust or readjust the height of the cutting apparatus by manipulation of the wheels 98 and 141, the result being attained through the fully-described mechanism connected therewith. The reel may be raised or lowered by means of the lever 136 and may be moved forward or rearward by means of the lever 137. The harvesting machinery may be disconnected from the motor by means of the clutch lever 177, and as will be understood the driving wheels may be stopped by disconnecting the clutch 82 from the engine. In case it is desired to use the tractor for other purposes than harvesting, the harvester frame may readily be disconnected from the tractor by disconnecting the dowels 107 and 107' from the sockets 91 and 91', after which the head portion of the harvester frame is removed from the opening under the arched portion of the tractor frame. It will be obvious that a mower appliance may be connected if desired to the hanger frames of the arched portion of the tractor frame, or a suitable carrying frame, or a wagon bed or receptacle for hauling purposes may be readily arranged in the opening in the tractor frame and supported on the ledges of the hanger frames as illustrated by broken lines in Fig. 25, from which it will readily be seen that a wagon bed may be carried in proximity to the ground and permit ready loading and unloading of swine or other animals, or various substances which require hauling from place to place.

In order to enter the carrying body or machinery frame in the opening in the tractor frame it is only necessary to lift the body or frame sufficiently high to pass above the ledges of the hanger frames, when the body may be freely moved between the hanger frames and lowered onto the ledges, the changing operations being easily and quickly performed by the ordinary or unskilled laborer.

The results of the operation of the different gearings and the harvesting machinery will readily be understood from the detailed description of the construction and function of the various parts thereof without further explanation.

Having thus described the invention, what is claimed as new is—

1. An interconvertible harvester, mower or tractor including a main frame having an arched portion spanning clear space and providing a clear archway, each end portion of the arched portion being provided with a hanger having a carrying ledge thereon, each ledge projecting toward the other under the archway to removably support a carrier to be seated thereon.

2. An interconvertible harvester, mower or tractor including wheels, a main frame supported by the wheels and having an arched portion providing a clear space thereunder to receive a carrying appliance, a motor on the frame operatively connected with two of the wheels, and two separate hanger frames spaced apart at opposite ends respectively of the arched portion to removably receive one of a plurality of different carrying appliances between them, the hanger frames being supported by the main frame and having each a carrying ledge provided with a device to removably secure the appliance thereto.

3. An interconvertible harvester, mower or tractor including wheels, a main frame supported by the wheels and having an arched portion providing unobstructed clearance space thereunder, each end of the arched portion having a pair of vertical guide bars, the two bars of the pair thereof being on opposite sides respectively of the frame, and two hanger frames arranged oppositely with clear space between them and having each an upward facing ledge thereon, each ledge projecting toward the other, one of the hanger frames being adjustable on one of the pair of guide bars, the other of the hanger frames being adjustable on the remaining pair of guide bars.

4. An interconvertible harvester, mower or tractor including a main frame having an arched portion spanning a clear space into which to freely receive a carrying body transversely of the frame under and clear of the arched portion, wheels supporting the frame, and two separate hanger frames arranged at the ends respectively of the arched portion and supported by the arched portion forward and rearward respectively of the clear space and having each a projecting ledge to removably support the carrying body.

5. An interconvertible harvester, mower or tractor including a main frame having two upright portions and a crown portion on the top of the upright portions, the space below the crown portion being unobstructed the upright portions being spaced apart, wheels supporting the frame, and two separate hanger frames supported by the main frame in spaced apart relation to freely receive and support a carrying body between them under the arched portion, one of the hanger frames having a bracing connection with one of the upright portions of the main frame.

6. An interconvertible harvester, mower or tractor including carrying wheels, a main frame mounted on the wheels and having two upright portions and a crown portion on the top of the upright portions, the upright portions being spaced apart and providing unobstructed space under the crown portion, two pairs of vertical guide bars secured to the crown portion of the frame and arranged respectively on parallel transverse planes, there being unobstructed space between the pairs of guide bars the lower portion of the two of each pair of bars having a cross-bar secured thereto, one of the pair of guide bars being secured to one of the upright portions of the frame, and two hanger frames spaced apart and guided by the respective pairs of guide bars and supported by the main frame.

7. An interconvertible harvester, mower or tractor having a main frame provided with two hanger frames arranged transversely of the main frame in spaced apart parallel relation to provide unobstructed space between them, each hanger frame extending from one to the opposite one of the two longer longitudinal sides of the main frame and being provided with an upwardly-facing seating and carrying device.

8. A combination machine including a tractor frame having an unobstructed opening extending transversely from side to side thereof, the frame portions forward and rearward of the opening being each provided with a seating and carrying device adjacent to and accessible from the opening, and a plurality of carrying appliances separately insertible freely into the opening in the frame, the forward and rearward sides of the appliances having each a seating and guiding device to be detachably connected with a seating and carrying device of the frame.

9. An interconvertible harvester, mower or tractor including a machinery frame, a tractor frame having an opening therein extending transversely from one to the opposite side thereof and loosely receiving the main portion of the machinery frame, the latter being freely removable from the opening, and freely separable means coöperating with the tractor frame and the machinery frame to secure the latter in the opening.

10. An interconvertible harvester, mower or tractor including a tractor frame having an arched portion providing an unobstructed opening extending from one to the opposite longitudinal side of the frame, two guide bars carried by the longitudinal sides respectively of the frame adjacent to the forward end of the arched portion, two guide bars carried by the longitudinal sides respectively of the frame adjacent to the rearward end of the arched portion, and two hanger frames arranged transversely of the tractor frame, one hanger frame being guided by two of the guide bars and the other by the remaining two guide bars, each hanger frame having a carrying ledge thereon.

11. An interconvertible harvester, mower or tractor including a tractor frame having an unobstructed opening therein extending transversely from one to the opposite side thereof, two hanger frames arranged forward and rearward respectively of the opening and adjustably supported by the tractor frame, a train of driving gearing mounted on the tractor frame, a harvester frame loosely inserted into the opening in the tractor frame and detachably connected to the hanger frames, the harvester frame being removable intact from the opening, harvester gearing mounted on the harvester frame, and freely separable devices detachably connecting the harvester gearing with the driving gearing.

12. An interconvertible harvester, mower or tractor including a tractor frame having an unobstructed opening therein extending transversely from one to the opposite side thereof, two hanger frames spaced apart in the opening and adjustably supported by the tractor frame, each of the hanger frames having a carrying ledge thereon that projects into the opening in the frame, a train of driving gearing mounted on the tractor frame, a harvester frame loosely inserted into the opening in the tractor frame and removably seated upon the ledges, the harvester frame being freely removable from the opening, harvester gearing mounted on the harvester frame, and freely-separable means detachably connecting the harvester gearing with the driving gearing.

13. An interconvertible harvester, mower or tractor including a tractor frame having an unobstructed opening therein extending transversely from one to the opposite side thereof, two pairs of guides secured to the tractor frame and extending downward into the forward and rearward portions respectively of the opening, the two of each pair of guides being at the two opposite longitudinal sides respectively of the tractor frame, two hanger frames arranged in the forward and rearward pairs of guides respectively, each hanger frame extending transversely of the tractor frame and being adjustably guided by the two of the adjacent pair of guides, means for supporting the hanger frames, a machinery frame loosely extending into the opening in the tractor frame, and means for detachably securing the machinery frame to the two hanger frames.

14. An interconvertible harvester, mower or tractor including a tractor frame having an arched portion providing an unobstructed opening extending from one to the opposite one of the longitudinal sides of the frame, two hanger frames arranged in the forward and rearward portions respectively of the opening and supported by the tractor frame, a train of driving gearing mounted on the tractor frame and having a coupling shaft that extends to the opening in the frame, a harvester frame loosely extending between the two hanger frames and removably secured thereto, a train of harvester gearing mounted on the harvester frame and having a main shaft in alinement with the coupling shaft, and clutch devices detachably connecting the main shaft to the coupling shaft.

15. An interconvertible harvester, mower or tractor including a tractor frame having an unobstructed opening extending transversely therethrough, the tractor frame being provided with two hanger frames spaced apart and extending downward into the opening, wheels supporting the frame, a motor mounted on the frame, gearing mounted on the frame to be driven by the motor, the gearing including a terminal shaft extending to and terminating at the opening in the frame, a machinery frame extending between the two hanger frames and removably seated thereon, cutting apparatus mounted on the machinery frame, gearing for the cutting apparatus mounted on the machinery frame and including a main shaft arranged in proximity to the terminal shaft, and means for detachably connecting the main shaft with the terminal shaft.

16. An interconvertible harvester, mower or tractor including a main frame having an unobstructed opening extending transversely therethrough and provided with two hanger frames spaced apart and extending downward into the opening, each hanger frame comprising two upright side members spaced apart and also transverse members fixed to the upright members, each hanger frame having a carrying ledge projecting into the opening in the main frame, the top of each ledge being provided with a socket, means for securing the hanger frames in the main frame to carry the hanger frames, and wheels supporting the main frame.

17. An interconvertible harvester, mower or tractor including a tractor frame having a motor thereon, wheels supporting the frame, a machinery frame adjustably and removably supported at one end on the tractor frame, a carrying wheel having an axle adjustably connected with the opposite end of the machinery frame, a controlling shaft rotatably mounted on the machinery frame, means connected with the controlling shaft for adjusting and controlling the axle of the carrying wheel, a device for rotating the controlling shaft, and means for holding the controlling shaft.

18. An interconvertible harvester, mower or tractor including a tractor frame and a motor thereon, wheels supporting the frame, a machinery frame adjustably and removably supported at one end on the tractor frame, a carrying wheel having an axle adjustably connected with the opposite end of the machinery frame, an adjusting shaft and a hollow shaft rotatably mounted on the machinery frame, the adjusting shaft extending through the hollow shaft, two reel-supporting appliances adjustably mounted on the machinery frame, two series of devices operatively connecting the two reel-supporting appliances with opposite ends respectively of the adjusting shaft, means for operating and controlling the adjusting shaft, means connected with the hollow shaft for adjusting and controlling the axle of the carrying wheel, a device for rotating the hollow shaft, means for holding the hollow shaft, mechanism mounted on the machinery frame and gearing detachably connected together enabling the motor to actuate the mechanism.

19. In an interconvertible harvester, mower or tractor, the combination with a carrying frame and a wheel adjustably supporting one end of the frame, of a main frame having an unobstructed transverse opening loosely receiving the opposite end of the carrying frame, wheels supporting the main frame, and means coöperating with the main frame and the carrying frame in the opening enabling the main frame to removably support the said opposite end of the carrying frame.

20. In an interconvertible harvester, mower or tractor, an arched frame having an unobstructed opening to receive a carrying body and provided in said opening with supporting and guiding means, wheels supporting the arched frame, and a motor mounted on the frame and operatively connected with two of the wheels, in combination with a carrying body extending loosely into the opening of the arched frame and removably connected in said opening with the supporting and guiding means for support and guidance.

21. In an interconvertible harvester, mower or tractor having a transverse opening therein, the combination of a main frame, wheels supporting the frame, guide bars secured vertically to the frame and extending downward into said opening, two hanger frames movably guided by the guide bars and having each a ledge thereon projecting into said opening and provided with a socket, means mounted on the main frame for adjustably supporting the two hanger frames, and a carrying frame loosely inserted between the hanger frames and having two dowels removably inserted in the two sockets respectively.

22. In an interconvertible harvester, mower or tractor, a main frame having a clear span arch affording an unobstructed opening beneath to receive a carrying body, the arch portion being provided with two oppositely disposed rectangular hanger frames spaced apart and arranged in said opening to admit the body freely between them, one of the hanger frames being supported transversely by the forward portion of the arch and having an upward-facing device for removably supporting and guiding the forward side of the body, the remaining one of the hanger frames being supported transversely by the rearward portion of the arch and having an upward-facing device for removably supporting and guiding the rearward side of the body.

23. In an interconvertible harvester, mower or tractor, the combination of a power-propelled vehicle having an unobstructed opening extending transversely therethrough and upward from the bottom of the vehicle to freely receive one of a number of different carrying appliances, the interior of said opening being provided at the forward and rearward portions thereof with carrier supports carried by the vehicle, a carrying appliance extending into the opening and to the carrier supports and removably seated on said supports, and cutting mechanism mounted on the carrying appliance.

24. In an interconvertible harvester, mower or tractor, a main frame comprising two main bars spaced apart, each bar having a horizontal portion and an arched portion on one end of the horizontal portion, the arched portion having a clear opening under it, a bolster secured directly to the lower ends of the arched portions of the bars that are distant from the horizontal portions of the bars, two transverse bars secured to the arched portions of the main bars, and an open frame secured horizontally to the horizontal portions of the main bars.

25. In an interconvertible harvester, mower or tractor, the combination of a main frame having an arched portion, the frame having a clear opening under the arched portion, four guide bars secured to the arched portion and extending downward into said opening, a shaft rotatably supported by the arched portion of the frame, a ratchet wheel and an operating wheel secured to the shaft, a dog mounted on the said arched portion and engaging the ratchet wheel, two hanger frames movably guided each by two of the guide bars, and means connected with the hanger frames and said shaft whereby the hanger frames are adjustably supported.

26. In an interconvertible harvester, mower or tractor, the combination of a main frame comprising two main bars spaced apart, each bar having upright portions and a crown bar on the tops of the upright portions, two cross-bars spaced apart and secured to said crown bars, guiding wheels and also propelling wheels supporting the main frame, supports for a carrying body carried by said cross-bars, a seat mounted upon one of said crown-bars, two bearing boxes mounted upon said one of the crown bars, a steering shaft rotatably mounted in said boxes and extending approximately to said seat, and operating and controlling means connected with the guiding wheels and said shaft.

27. In an interconvertible harvester, mower or tractor, the combination of a main frame comprising two main bars spaced apart, each bar having upright portions and a crown bar on the tops of the upright portions, two cross-bars spaced apart and secured to said crown bars, a shaft rotatably mounted on said cross-bars, two hanger frames spaced apart and guided to move adjacent to said cross-bars respectively, each hanger frame having a toothed bar thereon extending upward adjacent to said shaft, two toothed wheels secured on said shaft in engagement with said toothed bars respectively, a ratchet wheel secured to said shaft adjacent to one of said cross-bars, and a dog mounted on said cross-bar and engaging said ratchet wheel.

28. In an interconvertible harvester, mower or tractor, the combination of a unitary main tractor frame having an unobstructed opening therein extending transversely from one to the opposite longitudinal side thereof, wheels supporting the frame, two hanger frames suspended to the tractor frame and extending downward into the forward and rearward portions respectively of the opening, each hanger frame being arranged transversely of the tractor frame and extending approximately from one to the opposite longitudinal side thereof, a unitary machinery frame having one end portion loosely arranged within said opening and between said hanger frames to be freely removed intact therefrom, means for detachably securing said machinery frame to said hanger frames, and cutting mechanism on the machinery frame.

29. In an interconvertible harvester, mower or tractor, a main frame comprising two main bars spaced apart, an open frame secured to the main bars adjacent to one end thereof, a bolster secured directly to the opposite ends of the bars, two vertical guide bars secured to one of the main bars, two vertical guide bars secured to the remaining one of the main bars opposite to the first-described guide bars, two hanger frames that are approximately coextensive with the space between the main bars and vertically arranged transversely of the bars and movably guided by the guide bars, each hanger frame by a bar on each of the main bars, each hanger frame having a supporting ledge thereon for carrying a body, and means for adjustably supporting the said hanger frames in said guide.

30. In an interconvertible harvester, mower or tractor, the combination of a main frame having an arched portion and an unobstructed transverse opening under said portion, two hanger frames oppositely arranged in the said arched portion and extending downward into said opening, each hanger frame having a ledge thereon extending toward the ledge of the opposite one of the hanger frames within said opening, each ledge having two upward extending dowels and also a socket between the dowels for guiding a body, guides secured to the said arched portion and extending downward therefrom for vertically guiding the hanger frames, wheels supporting the main frame, and means coöperating with the said arched portion and said hanger frames for adjustably supporting the hanger frames relatively to the arched portion and said opening of the frame.

31. In an interconvertible harvester, mower or tractor, the combination of a main frame having an arched portion and an unobstructed transverse opening under said portion, platform frame supports carried by the frame and extending into the opening under the arched portion thereof, wheels movably supporting the frame, a platform frame having an inclined elevator frame on one end portion thereof that extends from the platform frame upwardly on one inclined plane in said opening, said end portion being removably seated on and connected to the frame supports within said opening, a floor on said platform frame beyond one side of said arched portion, cutting apparatus and also conveyer appliances and a reel on said platform frame, and conveyer appliances and also binding appliances on said elevator frame beyond the opposite side of said arched portion.

32. In an interconvertible harvester, mower or tractor, the combination of a main frame comprising two side bars, two cross-bars secured to the side bars, wheels supporting the frame, guide bars secured vertically to the frame side bars, there being two guide bars adjacent to each cross-bar, two hanger frames movably guided by the guide bars and having each a suspending device, each hanger frame being in engagement with two side bars, a shaft rotatably mounted on the two cross-bars and having winding means thereon coöperating with the suspending devices for adjustably supporting the two hanger frames, a ratchet wheel and an operating wheel secured to the shaft, a dog mounted on one of said cross-bars and in engagement with the ratchet wheel, means for connecting the winding means to the shaft or disconnecting the same therefrom, a carrying frame detachably connected to and guided by the said hanger frames, a winding drum secured to said shaft for winding a cable to lift the carrying frame, and a sheave mounted on the main frame side bars and opposite to the said drum for guiding the cable.

33. In an interconvertible harvester, mower or tractor, the combination of a main frame having an arched portion and an unobstructed transverse opening under the arched portion, a hanger frame carried by the main frame and extending into the opening under the arched portion thereof, wheels movably supporting the main frame, a machinery frame having one end portion extending loosely into the opening under the arched portion and removably seated on and supported by the hanger frame, a carrying wheel supporting the opposite end portion of the machinery frame, an arch erected upon the machinery frame in proximity to and parallel to the arched portion of the main frame, an end frame erected on the machinery frame parallel to said arch and adjacent to the carrying wheel, a reel frame having supports that are mounted on the arch and the end frame respectively, cutting apparatus mounted on the machinery frame, a motor mounted on the main fame, driving means mounted on the main frame to be actuated by the motor, and gearing mounted on the machinery frame and connected with the cutting apparatus, the gearing being provided with clutch means enabling the gearing to be connected with or disconnected and removed intact with the machinery frame away from the driving means.

34. In an interconvertible harvester, mower or tractor, the combination with guiding wheels, an axle carried by the wheels, a bolster carried by the axle, and a steering device for controlling the wheels, of a main frame comprising two arched bars that are spaced apart and secured to the bolster, two downward extending guide bars secured at their upper ends to each one of the two arched bars, two hanger frames adjustably guided each by the guide bars that are on opposite ones of the two arched bars, means coöperating with the main frame and the hanger frame affording adjustable support for said hanger frames, a carrying frame removably seated on and supported by said hanger frames, a tie-bar secured to two of said guide bars that are the nearer to the axle, a vertical shaft rotatably supported by one of the said arched bars and the tie-bar and operatively connected at its lower end with the steering device, the upper end of the shaft having a toothed gear fixed thereon, a steering shaft rotatably supported upon the main frame and extending over the carrying frame, a gear wheel secured to the steering shaft and engaging the toothed gear, and a steering wheel secured also to the steering shaft.

35. In an interconvertible harvester, mower or tractor, the combination of a main frame provided with an arched portion having an unobstructed opening thereunder and extending transversely of the frame for receiving a carrying frame and provided also with draft appliances rearward of the arched portion, the arched portion being provided with two separate pairs of downward extending guide bars, each guide bar extending beyond the bottom of the main frame, hanger frames adjustably guided by the guide bars and provided with adjusting supporting means therefor, the hanger frames being provided also with means arranged in said opening for supporting and guiding the carrying frame, driving wheels supporting the rearward portion of the main frame and provided with actuating means, and guiding wheels supporting the forward portion of the main frame and provided with controlling means.

36. In an interconvertible harvester, mower or tractor, the combination of a main frame having vertical guide bars, wheels supporting the frame, hanger frames adjustably guided by the guide bars, a short shaft rotatably mounted on one of the hanger frames, a counter-shaft rotatably mounted on the main frame, a driving pulley secured to the counter-shaft, a shaft having universal couplings connected to the counter-shaft and the short shaft, a motor mounted on the main frame for driving the counter-shaft, a machinery frame removably connected to the hanger frames and having a main driving shaft thereon, mechanism on the machinery frame connected with said driving shaft, and means for detachably connecting the main driving shaft with the short shaft.

In testimony whereof, we affix our signatures in presence of two witnesses.

CARL F. MILLICAN.
JONAS H. WIEST.

Witnesses:
E. T. SILVIUS,
J. H. GARDNER.